(12) United States Patent
Lee et al.

(10) Patent No.: US 7,442,745 B2
(45) Date of Patent: Oct. 28, 2008

(54) AMINOMETHYL POLYSTYRENE RESIN AND PREPARATION PROCESS FOR THE SAME

(75) Inventors: Yoon-Sik Lee, Anyang-si (KR); Sun-Jong Ryoo, Seoul (KR); Tae-Kyung Lee, Seoul (KR)

(73) Assignee: BeadTech Inc., Seoul (KR)

( * ) Notice: Subject to any disclaimer, the term of this patent is extended or adjusted under 35 U.S.C. 154(b) by 66 days.

(21) Appl. No.: 11/349,343

(22) Filed: Feb. 8, 2006

(65) Prior Publication Data

US 2006/0189766 A1  Aug. 24, 2006

(51) Int. Cl.
*C08G 63/48* (2006.01)
*C08G 69/26* (2006.01)

(52) U.S. Cl. ............... 525/66; 525/69; 525/374; 528/332

(58) Field of Classification Search ............ 525/66, 525/69, 374; 528/332
See application file for complete search history.

(56) References Cited

U.S. PATENT DOCUMENTS 5,235,028 A * 8/1993 Barany et al. ............... 528/335

OTHER PUBLICATIONS

Cho, J.K., et al. "Preparation of Core-Shell-Type Poly(ethylene glycol)- Grafted Polystyrene Resins and Their Characteristics in Solid-Phase Peptide Synthesis", *Macromol. Chem. Phys.*, vol. 203, No. 15, pp. 2211-2217, (2002).

Liu, R., et al. "A Novel Peptide-Based Encoding System for "One-Bead One-Compound" Peptidomimetic and Small Molecule Combinatorial Libraries", J. Am. Chem. Soc., vol. 124, pp. 7678-7680, (2002).

Kim, H., et al. "Core-Shell-Type Resins for Solid-Phase Peptide Synthesis: Comparison with Gel-Type Resins in Solid-Phase Photolytic Cleavage Reaction", *Organic Letters*, vol. 6, No. 19, pp. 3273-3276, (2004).

Sarin, V.K., et al. "Properties of Swollen Polymer Networks. Solvation and Swelling of Peptide-Containing Resins in Solid-Phase Peptide Synthesis" *J. Am. Chem. Soc.*, vol. 102, pp. 5463-5470, (1980).

McAlpine, S.R., et al. "Visualizing Functional Group Distribution in Solid-Support Beads by Using Optical Analysis", *Chem. Eur. J.*, vol. 5, No. 12, pp. 3528-3532, (1999).

Atherton, E., et al., "Polyamide Supports for Polypeptide Synthesis", *J. Am. Chem. Soc.*, vol. 97, No. 22, pp. 6584-6585, (Oct. 29, 1975).

Bayer, E., "Towards the Chemical Synthesis of Proteins" *Angew. Chem. Int. Ed. Engl.*, vol. 30, No. 2, pp. 113-129, (Feb. 1991).

Moss, J.A., et al., "Solid phase peptide synthesis on JandaJel™ resin", *Tetrahedron Letters*, vol. 43, pp. 37-40, (2002).

* cited by examiner

*Primary Examiner*—Randy Gulakowski
*Assistant Examiner*—Olga Asinovsky
(74) *Attorney, Agent, or Firm*—Nath Law Group

(57) ABSTRACT

The present invention relates to an aminomethyl polystyrene resin wherein aminomethyl group is grafted only on the surface of polystyrene resin, and a preparation process for the same. More particularly, the present invention is directed to a process for preparing aminomethyl polystyrene resin wherein aminomethyl group is grafted only on the surface of polystyrene resin, which comprises a step for grafting amidomethyl group to surface of polystyrene resin and a step for hydrolysis of the amidomethyl group grafted on the surface of polystyrene resin.

6 Claims, 4 Drawing Sheets

AMINOMETHYL POLYSTYRENE RESIN AND PREPARATION PROCESS FOR THE SAME

TECHNICAL FIELD

The present invention relates to an aminomethyl polystyrene resin wherein aminomethyl group is grafted only on the surface of polystyrene resin, and a preparation process for the same. More particularly, the present invention is directed to a process for preparing aminomethyl polystyrene resin wherein aminomethyl group is grafted only on the surface of polystyrene resin, which comprises a step for grafting amidomethyl group to surface of polystyrene resin and a step for hydrolysis of the amidomethyl group grafted on the surface of polystyrene resin.

BACKGROUND ART

Solid-state synthetic support resins have been developed tremendously since the theoretical studies on the solid-state syntheses by R. B. Merrifield. Solid-state synthetic polymer support resins should have mechanically and chemically stable characteristics and allow easy introduction of functional groups and versatile linker bondages, as well.

Spherical polystyrene resin cross-linked with 1 or 2% divinylbenzene has attracted much attention in solid-state peptide syntheses due to stable mechanical characteristics and swelling properties in the solvent.

Other polymer supports for solid state syntheses with various properties have been reported. R. C. Sheppard et al. have reported on the preparation of polyamide resin, which has advantages in syntheses of acyl carrier protein fragment (65-74) over conventional polystyrene resin due to solvent affinity (J. Am Chem. Soc. Vol. 97, 6584-6585, 1975).

Introduction of hydrophilic polyethylene glycol to polystyrene resin yields TentaGel® resin with wide solvent affinities, and whereby it is especially useful for peptide syntheses as a hydrophilic support (E. Bayer, Angew. Chem. Int. Ed. Vol. 30, 113-119, 1991).

Modifying polystyrene with flexible cross-linking agent allows JandaJel™ resin, which gives better yield in syntheses of acyl carrier protein fragment (65-74) than polystyrene resin cross-linked with 1% divinylbenzene due to better swelling property (Tetrahedron Letters Vol. 43, 37-40, 2002).

Besides the above characteristics, distribution of the functional groups within the resin also affects characteristic of the supports for solid-state reaction, because it provides reactant with accessibility to the reaction site.

CutiCore® resin, prepared by copolymerization of styrene and macromer with polyethylene glycol structure, results in core-shell structure with the functional group presiding selectively on the surface.

CutiCore® resin has showed better yield in amino acid coupling reaction in the initial preparatory stage of solid-state peptide syntheses and photo-cleavage reaction from the resins, as compared with polystyrene resin or TentaGel® resin (Macromol. Chem. Phys. Vol. 203, 2211-2217, 2002).

Resins with the above core-shell structure can be prepared by different process. K. S. Lam et al. have reported on the derivatization of only outer layer of TentaGel® resin in two-phase solvents to render resins with core-shell structure (J. Am. Chem. Soc. Vol. 124, 7678-7680, 2002).

Resins with core-shell structure for photo reaction can be prepared from copolymerization of aminomethyl polystyrene and 2,4,6-trichloro-1,3,5-triazine, followed by grafting with diamino polyethylene glycol (Organic Letters Vol. 6 3273-3276, 2004).

Aminomethyl polystyrene resin can be widely applied in solid-state reaction, such as coupling reaction of liker and spacer, peptide syntheses, and various organic syntheses, as well.

One of the techniques for characterization of the resin is autoradiography; Merrifield et al. confirmed even distribution of reaction-sites inside of the aminomethyl polystyrene resin by autoradiography (J. Am. Chem. Soc. Vol. 102, 5463-5470, 1980).

Confocal microscope can be also used for the scrutinizing the reaction sites. S. R. McAlpine et al. examined an optical slice of ArgoPore resin (polystyrene grafted with polyethylene glycol) on a confocal microscope, and confirmed even distribution of the reaction site, in contrast with aminomethyl polystyrene resin.

However, M. Bradley and G. Yung argued that quenching or re-absorbing caused no fluorescence light emitting from the inside of an optical slice. This was verified by examining the cross-section of resin, and even distribution of the functional group of aminomethyl polystyrene resin was detected by confocal Raman spectroscopy, on the contrary to aforementioned McAlpine's report (Chem. Eur. J. Vol. 5, 3528-3532, 1999).

To introduce aminomethyl functional group on the benzene ring of polystyrene resin, the following preparatory procedures can be employed: chloromethylation-ammonia substitution, phthalimidomethylation-dephthaloylation, trifluoroamidomethylation-deacylation, and copolymerization of phthalimide monomer-dephthaloylation.

Random distribution of aminomethy group is usually achieved on the support resin by the above preparations. For example, trifluoroacetamidomethylation-deacylation is convenient preparation due to simple hydrolysis. However C—N in trifluoroacetylamide is weak enough to undergo a complete hydrolysis, even inside the resin. Therefore, the core-shell structure can't be obtained by employing this preparation. As a result, the reactions with the functional group take place mainly at the surface of the resin due to the limited accessibility of the inside functional group. Therefore, more efficient utilization of aminomethyl group can be achieved with selective dispersion of the functional group on the surface than the random distribution.

There has been a need in the art to overcoming the drawbacks of the prior arts. Therefore, development of economic and yet convenient preparation process for controlled dispersion of the aminomethyl group on the surface of polystyrene resin has attracted much interest for more efficient utilization of the functional group.

DISCLOSURE OF THE INVENTION

According to one broad aspect of the invention, there is provided the aminomethyl polystyrene resin wherein aminomethyl group is grafted only on the surface of polystyrene resin. Hereinafter, the core-shell structure represents the resin with the functional groups presiding selectively on the surface. Synthesis of aminomethyl polystyrene resin is comprised of two steps, a step of introducing an amidomethyl group; and a step of elimination of acyl group. FIG. 1 represents the core-shell structure to be achieved from this invention, where in the functional group (for example aminomethyl) is dispersed exclusively on the surface of the resin.

According to another aspect of the invention, there is provided a process for preparing aminomethyl polystyrene resin wherein aminomethyl group is grafted only on the surface of polystyrene resin, which comprises a step for grafting amidomethyl group to surface of polystyrene resin and a step for hydrolysis of the amidomethyl group grafted on the surface of polystyrene resin.

The Spherical amidomethyl polystyrene resin (2) can be prepared from the reaction of the spherical polystyrene resin (1) and electrophilic amidomethyl reagent in the presence of a catalyst, according to Reaction Formula 1.

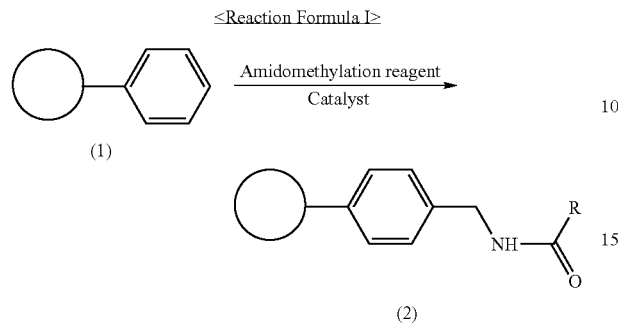

Electrophilic amidomethyl reagent is as shown in Chemical Formula 1, and prepared in-situ and utilized.

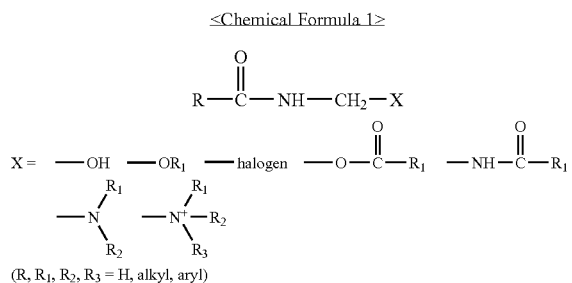

The following catalysts, as pure or mixed catalyst of two or more, can be a candidate for the Reaction Formula 1; Bronsted acid of sulfuric acid, nitric acid, hydrofluoric acid, hydrochloric acid, formic acid, acetic acid, trifluoroacetic acid, methanesulfonic acid, trifluoromethanesulfonic acid, and p-toluenesulfonic acid, and Lewis acid of $POCl_3$, $AlBr_3$, $AlCl_3$, $BCl_3$, $BF_3$, $BiCl_3$, $GaCl_3$, $FeCl_3$, $SbCl_3$, $SbCl_5$, $SnCl_4$, $TeCl_2$, $TeCl_4$, and $ZnCl_2$.

The following solvents, as pure or mixed solvent of two or mixed, can be used for the Reaction Formula 1; chlorinated solvent of dichloromethane, chloroform, carbontetrachloride, 1,2-dichloroethane, o-dichlorobenzene, m-dichlorobenzene, and p-dichlrobenzene, nitrated solvent of nitromethane and nitrobenzene, other organic solvent of tetrahydrofuran, diethyl ether, benzene, carbon disulfide, acetone, ethanol, and methanol, and acid of formic acid, acetic acid, propionic acid, methanesulfonic acid, and sulfuric acid.

The reaction can be carried at the temperature, not restrictively, but usually between 0 and 200° C., and preferably between 0 and 150° C. The reaction takes usually between 10 minutes to 72 hours, but considering reactivity of the reactants and efficiency between 30 minutes to 48 hours is preferable.

Resin (3) with the core-shell structure can be prepared from hydrolysis of the surface amidomethyl functional group of spherical amidomethyl polystyrene resin (2) according to Reaction Formula 2. The resulting resin contains aminomethyl functional group only at the outer layer, meanwhile intact amidomethyl exits at the inner layer of the resin.

Then, aminomethyl at the outer layer can be bonded to a linker, and the following peptide synthesis or other organic reaction can take place only at the outer layer.

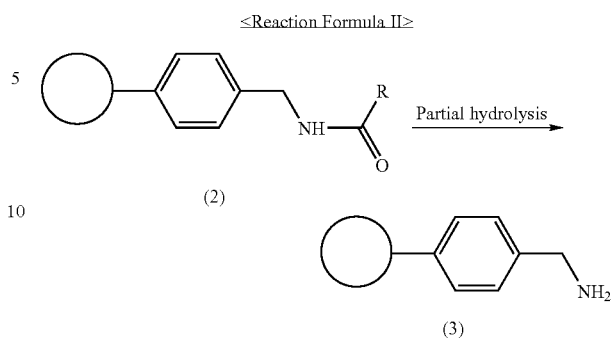

Strong acid can be used for the above hydrolysis reaction of amide bond, for example, hydrochloric acid, sulfuric acid, nitric acid, and phosphoric acid. Rather weak acid, formic acid, acetic acid, and propionic acid can be also used.

In the solvent, the spherical amidomethyl polystyrene resin shouldn't be swollen at all. But if it is, it should be barely swollen just enough to let the reactant dispersed only within the outer layer of the resin. Such solvent, as pure or mixed solvents of two or more, is as follows; water, methanol, ethanol, propanol, ethylene glycol, propylene glycol, 2-methoxy ethanol, 2-ethoxy ethanol, 1-methoxy-2-propanol, acetic acid, and propionic acid.

The reaction can be carried at the temperature not restrictively, but usually between 0 and 200° C., and preferably between 0 and 150° C. The reaction takes usually between 10 minutes to 72 hours, but considering reactivity of reactants and efficiency between 30 minutes to 48 hours is preferable.

The following strong base can also hydrolyze the amide bond; hydroxide of alkaline metal of potassium hydroxide and sodium hydroxide, hydroxide of alkaline earth metal of calcium hydroxide and barium hydroxide, carbonate of alkaline metal of sodium carbonate and potassium carbonate, and carbonate of alkaline earth metal of calcium carbonate and barium carbonate. The adequate solvent is about the same as that for the acid reaction, where the polystyrene resin is barely swollen, for example, water, methanol, ethanol, propanol, ethylene glycol, propylene glycol, methoxy ethanol, ethoxy ethanol, or 1-methoxy-2-propanol, The reaction can be carried at the temperature not restrictively, but usually between 0 and 200° C., and preferably between 0 and 150° C. The reaction takes usually between 10 minutes to 72 hours, but considering reactivity of the reactants and efficiency between 30 minutes to 48 hours is preferable.

Distribution of the functional group of polystyrene can be examined on a confocal microscope after coupled with fluorescent isothiocyanate (FITC). Another way to scrutinize it is to examine cross-sectioned resin, coupled with FITC then followed by fixation with 2-hydroxymethyl methacrylate, by a microtome on a microscope or confocal microscope.

BRIEF DESCRIPTION OF THE DRAWING

In order to understand the invention and to see how it may be carried out in practice, a preferred embodiment will now be described, by way of non-limiting example only, with reference to the accompanying drawings, wherein.

BEST MODE FOR CARRYING OUT THE INVENTION

Figure 1:
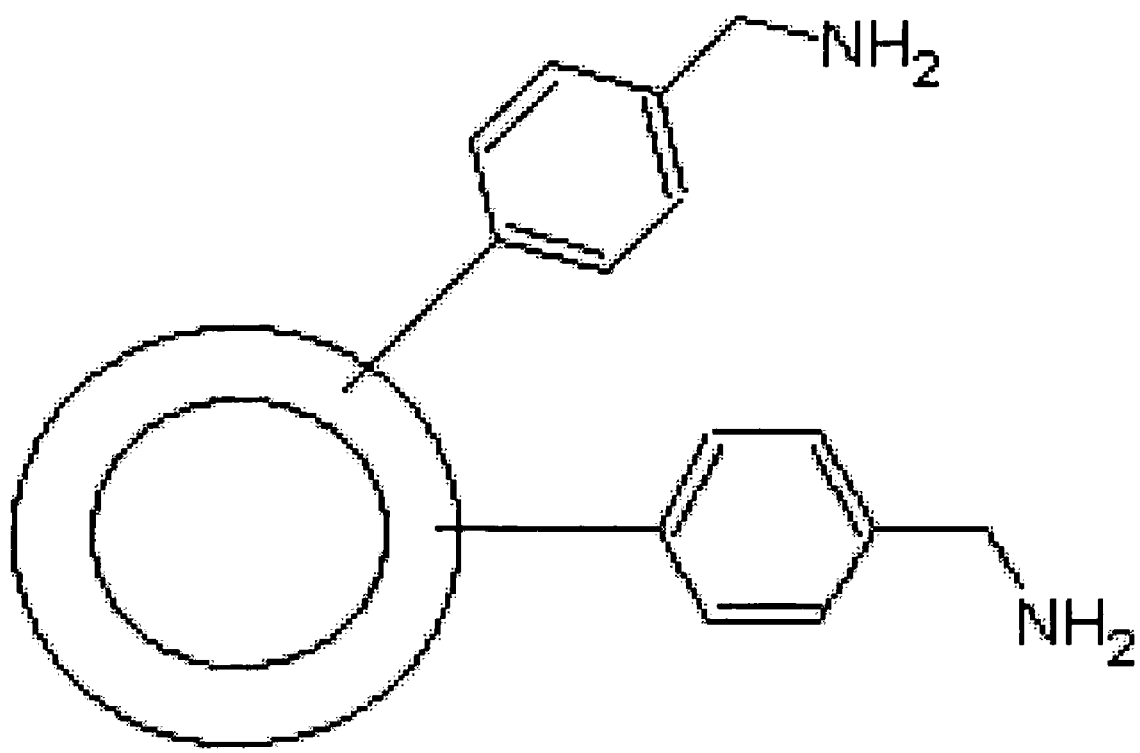
FIG. 1 is illustrative of core-shell structure with the functional group exiting only on the surface layer of the resin.
Figure 2:
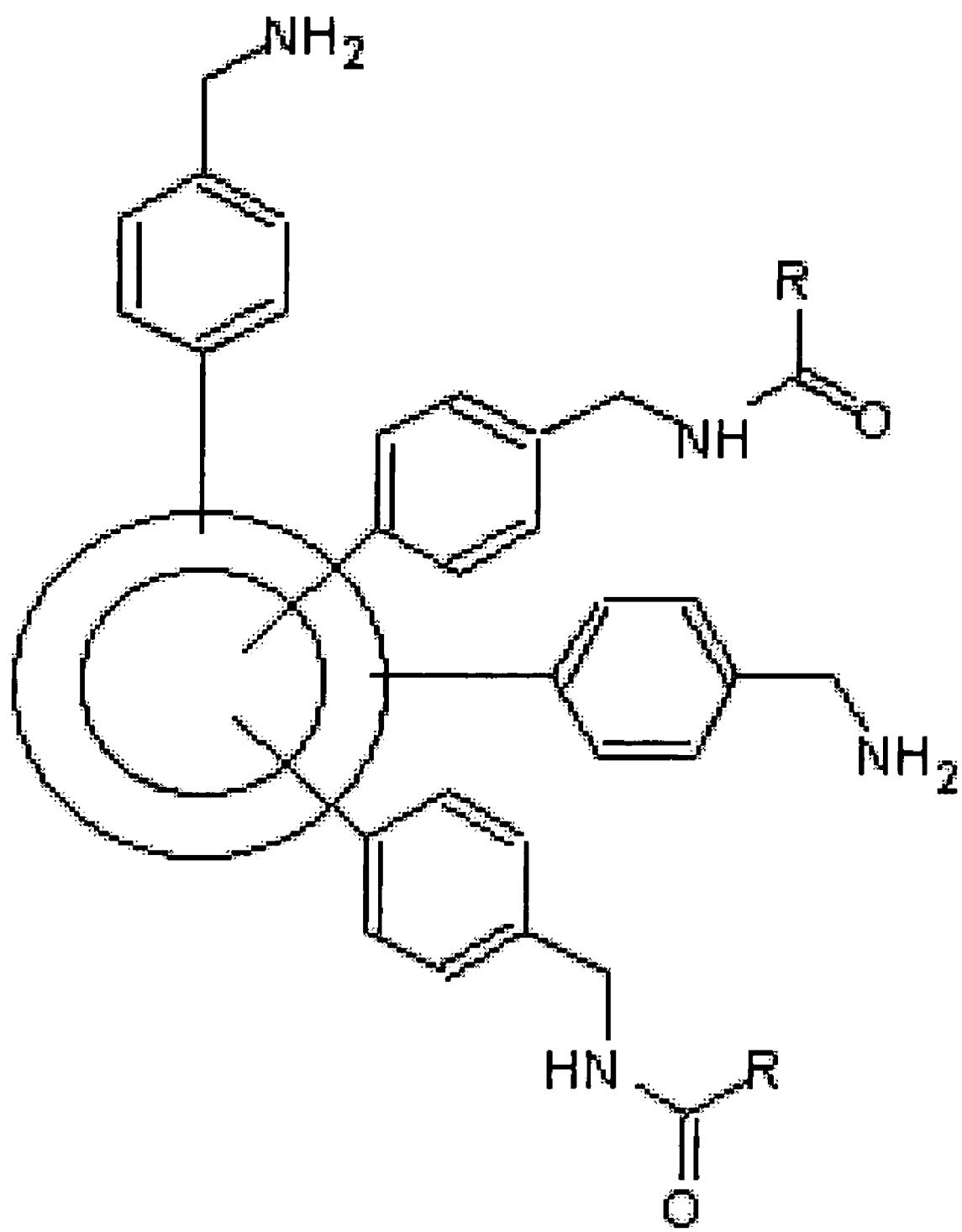
FIG. 2 is illustrative of core-shell structure with the aminomethyl functional group exiting only on the surface layer of the resin, meanwhile inside of the resin intact amidomethyl group existing, not undergoing hydrolysis.

The present invention will be more specifically illustrated by the following examples, but it should be understood that the present invention is not limited to these examples in any manner.

EXAMPLE 1

Preparation of the Acetamidomethyl Polystyrene Resin

Polystyrene resin crossed-linked with 1% divinylbenzene (20 g) was dissolved with 1,2-dichloroethane (200 ml) in a three-neck round bottom flask (1L) assembled with a mechanical stirrer and a thermometer. To the stirred solution, N-hydroxymethylacetamide (10.5 g) and trifluoroacetic acid (50 ml) was added.

The solution was refluxed with a heating mantle for 20 hours. After it was cooled to the room temperature, it was filtered on a glass-frit and the resulting resin was washed with the following solvent in sequence; tetrahydrofuran, mixed solvent of N,N-dimethylformamide-distilled water (3:1), dichloromethane, and finally methanol.

The washed resin was dried under a vacuum, and the resulting acetamidomethyl polystyrene resin (21.5 g) was obtained. And substitution rate was analyzed by an elemental analysis to be 1.4 mmol/g.

EXAMPLE 2

Preparation of the Chloroacetamidomethyl Polystyrene Resin

Polystyrene resin crossed-linked with 1% divinylbenzene (20 g) was mixed with nitrobenzene (200 ml) in a three-neck round bottom flask (1L) assembled with a mechanical stirrer and a thermometer. To the stirred solution, N-hydroxymethyl-2-chloroacetamide (6.4 g) and sulfuric acid (32 ml) was added.

The solution was stirred at 30° C. for 3 hours, and the same work-up procedures used in the above example 1 were employed for the rest of the preparation to get the resulting chloroacetamidomethyl polystyrene resin (26.4 g, substitution rate of 1.8 mmol/g).

EXAMPLE 3

Preparation of Core-Shell Aminomethyl Polystyrene Resin

Acetamidomethyl polystyrene resin (substitution rate 1.4 mmol/g, 20 g) was mixed with ethylene glycol (150 ml) in a three-neck round bottom flask (1L) assembled with a mechanical stirrer and a thermometer. To the stirred solution, hydrochloric acid (35%, 150 ml) was added. The solution was refluxed with a heating mantle at 110° C. for 22 hours.

After it was cooled to the room temperature, it was filtered on a glass-frit and the resulting resin was washed with the following solvent in sequence; mixed solution of tetrahydrofuran-1 N NaOH aqueous solution (3:1), mixed solvent of tetrahydrofuran-distilled water (3:1), tetrahydrofuran, and finally methanol. The washed resin was dried under a vacuum, and the resulting core-shell aminomethyl polystyrene resin (18.5 g) was obtained. And substitution rate (0.92 mmol/g) was analyzed by examining ultra-violet radiation absorbance of the dibenzofulvene-piperidine adduct at 290 nm, which was prepared from treatment of the core-shell aminomethyl polystyrene resin coupled with Fmoc-Gly-OH with 20% piperidine-N,N-dimethylformamide solution.

EXAMPLE 4

Preparation of the Core-Shell Aminomethyl Polystyrene Resin 2

Acetamidomethyl polystyrene resin (substitution rate 0.90 mmol/g, 20 g) was mixed with proronic acid (200 ml) in a three-neck round bottom flask (1L) assembled with a mechanical stirrer and a thermometer. To the stirred solution, hydrochloric acid (35%, 50 ml) was added. The solution was stirred at 110° C. for 24 hours with a heating mantle, and the same work-up procedures used in the above example 3 were employed for the rest of the preparation to get the resulting core-shell aminomethyl polystyrene resin (19.7 g, substitution rate of 0.44 mmol/g).

EXAMPLE 5

Preparation of the Core-Shell Aminomethyl Polystyrene Resin Bonded with FITC

After the aminomethyl polystyrene resin was swelled in N-metyl-2-pyrollidine (NMP), 3 equivalents of fluorescent isothiocyanate (FITC) and 6 equivalents of N,N-diisopropyl ethyl amine (DIEA) were added. After the solution was stirred at 30° C. for 15 hours, the solution was filtered. The resulting resin was washed with the following solvent in sequence; N-methyl-2-pyrollidine (NMP), dichloromethane, methanol, N-methyl-2-pyrollidine (NMP), dichloromethane, and finally methanol. The washed resin was dried under a vacuum to yield the core-shell aminomethyl polystyrene bonded with FITC.

EXAMPLE 6

Analyses of the Core-Shell Aminomethyl Polystyrene Resin Bonded with FITC

Figure 3A:
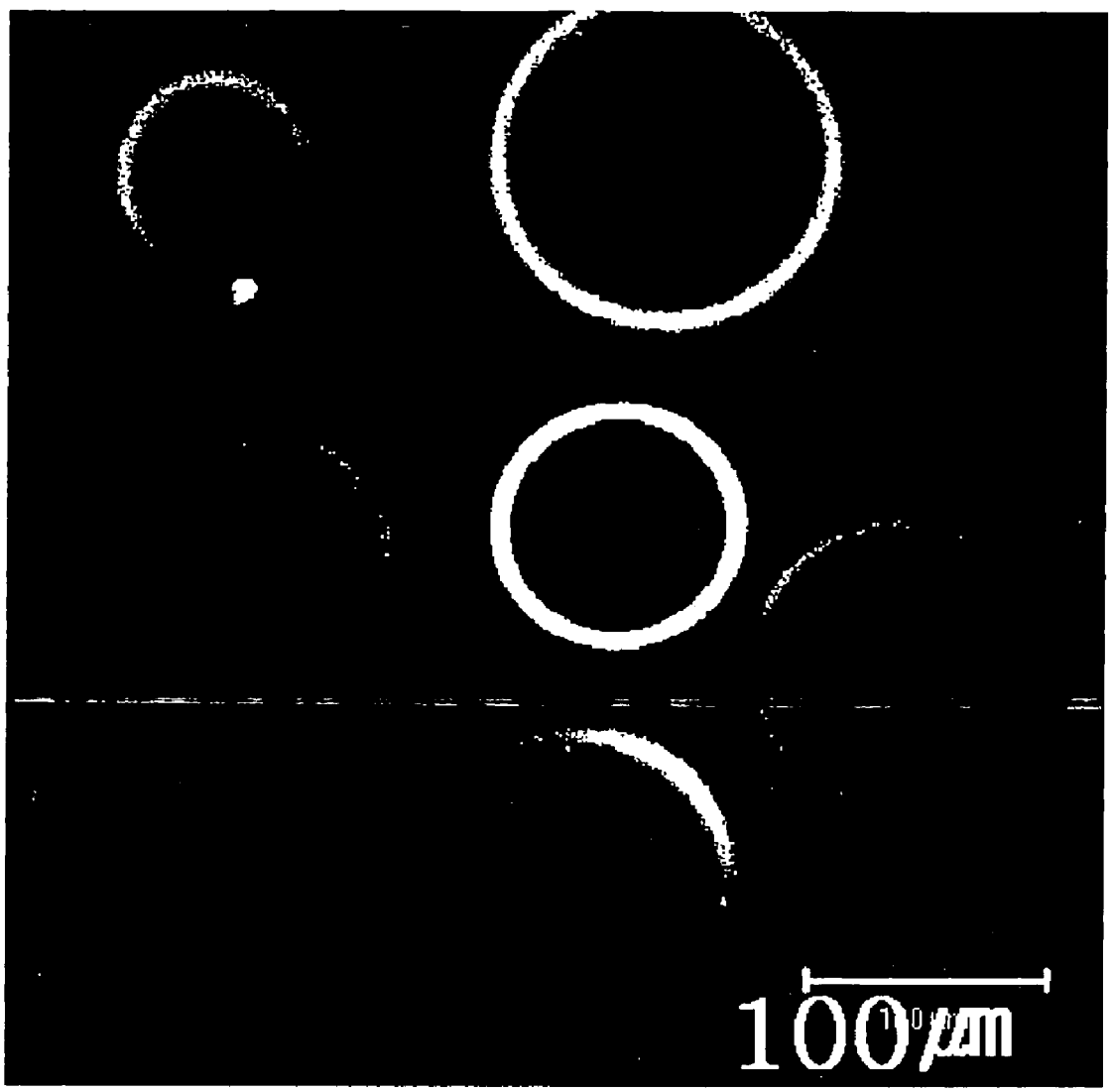
FIG. 3a is a confocal microscopic view of core-shell of aminomethyl polystyrene resin with FITC (fluorescent isothiocyanate) incorporated.

The core-shell aminomethyl polystyrene resin bonded with FITC was analyzed on a confocal microscope, and a microscopic view was shown in FIG. 3a.

EXAMPLE 7

Figure 3B:
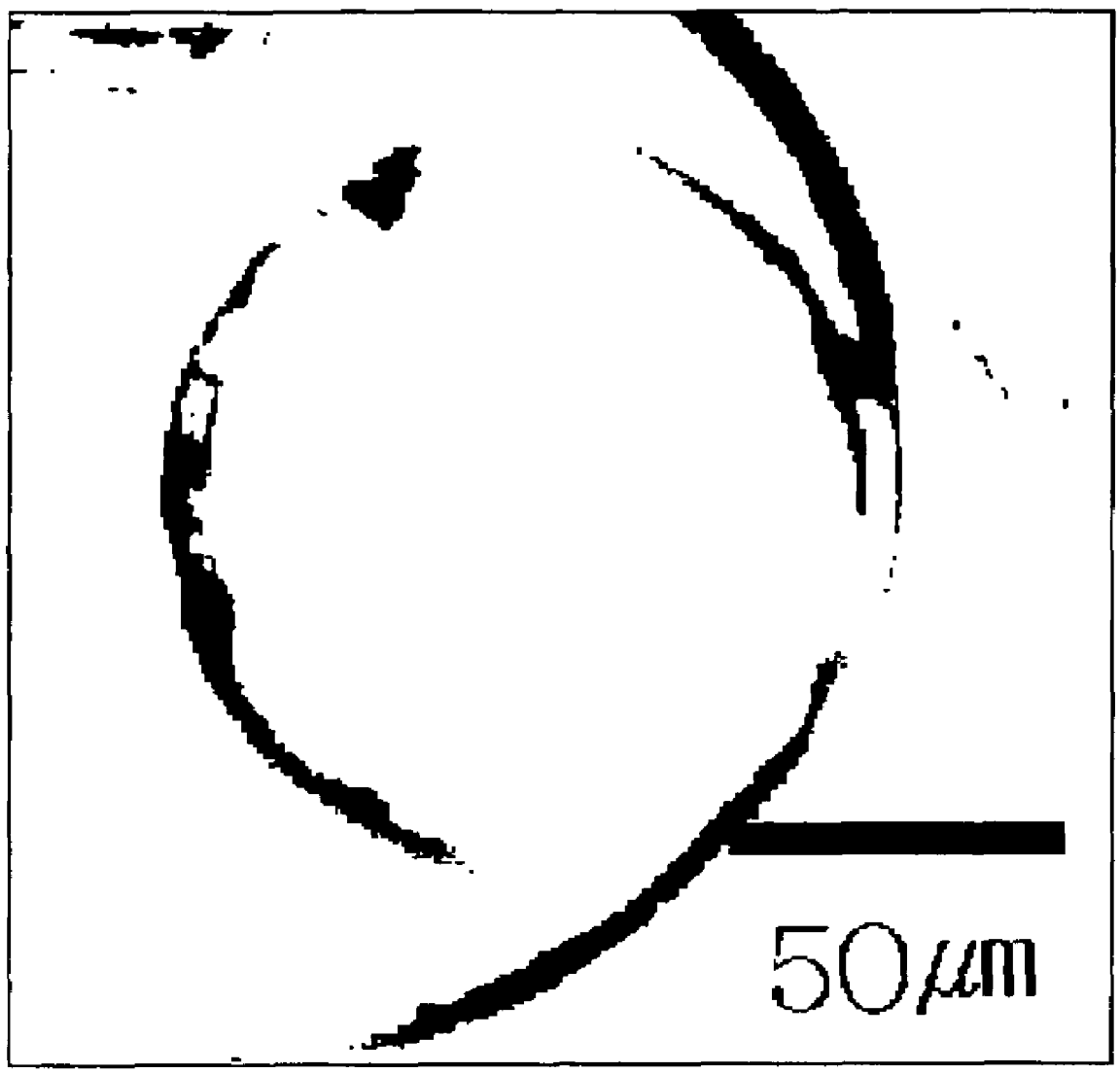
FIG. 3b is an optical microscopic view of cross-section of core shell of aminomethyl polystyrene resin with FITC (fluorescent isothiocyanate) incorporated.

Analyses of Cross-Section of Core-Shell Aminomethyl Polystyrene Resin Bonded with FITC The core-shell aminomethyl polystyrene resin bonded with FITC was inserted in 2-hydroxyethyl methacrylate (2.0 ml) and then 2,2'-azobisisobutyronitril (20 mg). The resulting solution was stirred at 70° C. for 24 hours to fix the resin. The fixed resin was cross-sectioned with a microtome, and the resulting face was analyzed with an optical microscope (FIG. 3b).

INDUSTRIAL APPLICABILITY

This invention allows controlled dispersion of the functional group of the spherical aminomethyl polystyrene resin for solid state syntheses to get the core-shell structure resin, of which only the surface contains the functional group. As a result, the reactions with the functional group take place mainly at the surface of the resin due to the limited accessibility of the inside functional group. Therefore, more efficient utilization of the aminomethyl group can be achieved with selective dispersion of the group on the surface than the random distribution.

The invention being thus described, it will be obvious that the same may be varied in many ways. Such variations are not to be regarded as a departure from the spirit and scope of the invention and all such modifications are intended to be included within the scope of the following claims.

What is claimed is:

1. A core-shell structured amidomethyl polystyrene resin wherein the core made of amidomethyl polystyrene resin and the shell made of aminomethyl group are grafted only on the surface of the core.

2. A process for preparing a core-shell structured amidomethyl polystyrene resin wherein the core made of amidomethyl polystyrene resin and the shell made of aminomethyl group are grafted only on the surface of the core, which comprises:

i) a step for grafting amidomethyl group to polystyrene resin; and ii) a step for hydrolysis of the amidomethyl group grafted on the surface of the amidomethyl polystyrene resin.

3. The process according to claim 2, wherein a catalyst employed for the step for hydrolysis is selected from the group consisting of hydrochloric acid, sulfuric acid, nitric acid, hydrofluoric acid, formic acid, acetic acid, propionic acid and the mixtures thereof.

4. The process according to claim 2, wherein a catalyst employed for the step for hydrolysis is selected from the group consisting of hydroxide of alkaline metal, hydroxide of alkaline earth metal, carbonate of alkaline metal, carbonate of alkaline earth metal and the mixtures thereof.

5. The process according to claim 3, wherein a solvent employed for the process is selected from the group consisting of water, methanol, ethanol, propanol, ethylene glycol, propylene glycol, methoxy ethanol, ethoxy ethanol, or 1-methoxy-2-propanol, acetic acid, propionic acid and the mixtures thereof.

6. The process according to claim 4, wherein a solvent employed for the process is selected from the group consisting of water, methanol, ethanol, propanol, ethylene glycol, propylene glycol, methoxy ethanol, ethoxy ethanol, 1-methoxy-2-propanol and the mixtures thereof.

\* \* \* \* \*